United States Patent
Foo et al.

(10) Patent No.: US 7,430,473 B2
(45) Date of Patent: Sep. 30, 2008

(54) VEHICLE NAVIGATION DISPLAY

(75) Inventors: Edwin W. Foo, Shrewsbury, MA (US);
Thomas E. McBrine, N. Attleboro, MA (US); John Michael Sakalowsky, West Newton, MA (US)

(73) Assignee: Bose Corporation, Framingham, MA (US)

( * ) Notice: Subject to any disclaimer, the term of this patent is extended or adjusted under 35 U.S.C. 154(b) by 656 days.

(21) Appl. No.: 10/956,751

(22) Filed: Oct. 1, 2004

(65) Prior Publication Data
US 2006/0074553 A1    Apr. 6, 2006

(51) Int. Cl.
*G01C 21/34* (2006.01)
*G08G 1/0969* (2006.01)

(52) U.S. Cl. ............ 701/212; 701/208; 701/211; 340/995.15; 340/995.19

(58) Field of Classification Search ............ 701/212, 701/201, 208, 209, 210, 211; 340/995.1, 340/995.14, 995.15, 995.17, 995.19, 995.23, 340/990; 707/4
See application file for complete search history.

(56) References Cited

U.S. PATENT DOCUMENTS

| | | | |
|---|---|---|---|
| 4,776,016 A | 10/1988 | Hansen | |
| 4,914,605 A | 4/1990 | Loughmiller | |
| 5,323,321 A | 6/1994 | Smith, Jr. | |
| 5,559,707 A | 9/1996 | DeLorme | |
| 5,587,911 A | 12/1996 | Asano | |
| 5,739,772 A * | 4/1998 | Nanba et al. ............ 340/990 |
| 5,754,430 A | 5/1998 | Sawada | |
| 5,802,492 A | 9/1998 | De Lorme et al. | |
| 6,009,355 A | 12/1999 | Obradovich | |
| 6,175,801 B1 | 1/2001 | Millington | |
| 6,278,940 B1 | 8/2001 | Endo | |
| 6,321,158 B1 | 11/2001 | DeLorme et al. | |
| 6,324,472 B1 | 11/2001 | O'Shea | |
| 6,330,497 B1 | 12/2001 | Obradovich | |
| 6,404,420 B1 | 6/2002 | Klein et al. | |
| 6,456,931 B1 | 9/2002 | Polidi | |
| 6,477,526 B2 * | 11/2002 | Hayashi et al. ............ 707/4 |
| 6,571,169 B2 | 5/2003 | Miyaki | |
| 6,574,551 B1 | 6/2003 | Maxwell | |
| 6,587,787 B1 | 7/2003 | Yokota | |
| 6,614,419 B1 | 9/2003 | May | |

(Continued)

FOREIGN PATENT DOCUMENTS

EP    0 199 780 B1    12/1996

(Continued)

OTHER PUBLICATIONS

Magellan Road Mate 500/700 copyright dated 2003. Document retrieved from http://www.magellangps.com/assets/manuals/newprod/manual_MagellanRoadMateSeries.pdf on Sep. 17, 2004.

(Continued)

*Primary Examiner*—Tan Q Nguyen
(74) *Attorney, Agent, or Firm*—Fish & Richardson P.C.

(57) ABSTRACT

A mobile navigation system includes a graphical display for presentation of map information. Map features are selected for presentation on a display. Characteristics for display are also selected. The characteristics for display include a scale for display that varies across the display. An image for display is generated from the selected features according to a selected scale.

40 Claims, 9 Drawing Sheets

U.S. PATENT DOCUMENTS

| | | | |
|---|---|---|---|
| 6,640,185 | B2 | 10/2003 | Yokota |
| 6,647,338 | B1 | 11/2003 | Hamberger et al. |
| 6,704,024 | B2 | 3/2004 | Robotham et al. |
| 6,732,049 | B2 | 5/2004 | Sato |
| 6,765,554 | B2 | 7/2004 | Millington |
| 6,771,189 | B2 | 8/2004 | Yokota |
| 6,859,723 | B2 | 2/2005 | Yokota |
| 6,904,338 | B2 | 6/2005 | Weimper |
| 2003/0046401 | A1 | 3/2003 | Abbott |
| 2003/0063133 | A1 | 4/2003 | Foote |
| 2006/0074553 | A1 | 4/2006 | Foo et al. |

FOREIGN PATENT DOCUMENTS

| | | |
|---|---|---|
| EP | 0 793 074 | 9/1997 |
| EP | 1 102 037 | 5/2001 |
| EP | 1 113 410 | 7/2001 |
| EP | 1 288 627 | 3/2003 |
| EP | 1 378 723 | 1/2004 |
| EP | 1 541 969 | 12/2004 |
| EP | 1 643 214 A2 | 4/2006 |
| JP | 9-244528 | 9/1997 |
| JP | 2001-066143 | 3/2001 |
| JP | 2003-269984 | 9/2003 |
| JP | 2004-170359 | 6/2004 |
| JP | 2006-105993 | 4/2006 |
| WO | WO 86/02764 | 5/1986 |
| WO | WO 97/42601 | 11/1997 |
| WO | WO 02/33541 | 4/2002 |
| WO | WO2004099720 | 11/2004 |

OTHER PUBLICATIONS

Alpine-Europe. NVE-N099P-DVD GPS Navigation System. http://www.alpine-europe/alpine/cms/details.php?p=528&details=1 on Sep. 17, 2004.

Magellan Road Mate 700 (North America) copyright dated 2004. Document retrieved from http://www.mgellangps.com/en/products/product.asp?PRODID=995 on Sep. 17, 2004.

Pioneer In-Car Multimedia/Navigation 2004-2005. Document retrieved from http://pioneer-eur.com/files/brochures/04_CE_NAVI/04_CE/NAVI_EN.pdf on Sep. 22, 2004.

Davis D. Janowski, http://www.pcmeg.com/print_article/0,1761,a=34633,00.asp, Handheld GPS Devices, Dec. 16, 2002.

http://www.magellangps.com/en/products/product.asp-?PRODID=950, MapSend DirectRoute, Magellan Products, downloaded Aug. 27, 2004.

http://hertzneverlost.com/most.cfm, Navigation Solutions—Getting the most out of Neverlost, Douwnloaded Aug. 27, 2004.

Chrysler Navigation User's Manual, DaimlerChrysler Corporation, 81-170-04010, Printed in the USA, First Edition, Copyright 2003.

BMW Owner's Manual for Vehicle, copyright 2004 Bayerische Motoren Werke Aktiengesellschaft, Munich Germany, Order No. 01 41 0 157 980, Content Page, pp. 16-22, pp. 108-122.

Audi Navigation System Plus Operating Instructions Manual, http://www.nav-plus.com/instructions/images/audimanual.pdf. Appears to be an English version dated Aug. 1999, p. 78.

Pioneer sound.vision.soul, Operation Manual, English Version, Double-Din DVD Navigation System, Published by Pioneer Corporation, Copyright 2005, Printed in Japan.

http://maps.yahoo.com/beta/index.php#trf=0.

* cited by examiner

VEHICLE NAVIGATION DISPLAY

BACKGROUND

This description relates to a vehicle navigation display.

A vehicle navigation system typically tracks a location of a vehicle using a combination of satellite-based position sensing (e.g., using the Global Positioning System, GPS) and dead reckoning (e.g., using odometer measurements). Data representing features of a map are stored in the vehicle, for example, on a removable disk (e.g., a DVD-ROM). One provider of such map data is Navteq Corporation.

The map data is used to display a map of the vicinity of the vehicle on a display screen in the vehicle, such as on a screen mounted in the dashboard. The vehicle's location is indicated on the map display. The map display is updated as the vehicle drives along the road network. Points of interest, such as gas stations and restaurants, may also be displayed. In some systems, the user can manually select a degree of zoom to change the size of the map features displayed. In some systems, the degree of zoom is automatically varied according to the location of a next turn or other maneuver in a planned route.

Vehicle navigation systems also typically provide a route planning capability in which the driver selects a destination and the system determines a path though the connected road segments of the map data. Various optimization approaches are used (e.g., graph-based shortest-path algorithms), for example, to minimize a total distance to be traveled or to minimize an expected travel time. The planned path generally includes "maneuvers," such as turns at intersections or a merges onto highways that the vehicle is to make in order to follow the path.

Navigation systems also typically provide a route guidance capability in which the driver is guided along a planned route. Such systems provide instructions to the driver using one or more of a map display in which the planned route is indicated, schematic displays of maneuvers (e.g., turns) to be performed by the driver, and audible instructions. Some systems provide a concurrent display of a map and a schematic display to guide the driver along the planned route to provide both an overall view of the route as well as detailed instructions and maneuvers in the route.

SUMMARY

In one aspect, in general, the invention features a method and associated software and a system for display of information for a mobile navigation system. Map features are selected for presentation on a display. Characteristics for display are also selected. The characteristics for display include a scale for display that varies across the display. An image for display is generated from the selected features according to a selected scale.

In another aspect, in general, the invention features a method and associated software and a system for display of information for a mobile navigation system. Characteristics for display are selected according to a distribution of features in a map database. An image for display of a map is then generated according to the selected characteristics.

In another aspect, in general, the invention features a method and associated software and a system for presenting information in a moving vehicle. A location of the vehicle and a travel route on a road network are identified. Map features that are coming up on the travel route are selected according to the identified location and travel route. A list of identifications of selected map features is then presented in the vehicle.

Aspects of the invention can include one or more of the following features.

Selecting at least some of the features is performed according to a level of detail of each feature.

The map features include at least one of a road segment, a point of interest, a traffic signal, a geographic feature, and a political region.

The characteristics for display include a level of detail, which may vary across the display.

The characteristics for display include a degree of highlighting that varies across the display. The degree of highlighting can include a degree of image intensity or a degree of image color saturation.

Selecting of the characteristics for display is repeated at different locations of the mobile navigation system. For example, the mobile navigation system is associated with a vehicle, and the selecting of the characteristics for display is repeated as the vehicle travels over a road network.

An increasing level of detail is provided as the vehicle approaches a predetermined location in the road network. The predetermined location in the road network can be a location of a planned maneuver for the vehicle.

Selecting of the characteristics for display includes using factors such as a position of a vehicle, a path of a route for the vehicle, a location of a maneuver on the route, and a distribution of features.

Selecting of the characteristics for display includes selecting a greater level of detail or a larger scale for a region near the vehicle as compared to a region relatively farther away from the vehicle, for a region near the path of the route as compared to a region relatively farther away from the path, for a region near a maneuver on the route as compared to a region relatively farther away from the maneuver, or for a region with a relatively greater number of features as compared to a region with a relatively fewer number of features.

The characteristics for display are selected according to a distribution of features of planned route or according to a spatial density of map features. For example, a relatively larger scale is selected for a higher density of features than for a lower density of features. The characteristics for display can be selected according to a density of the map features along a route.

Selecting characteristics for display includes selecting a scale for display. The scale for display can be selected to vary across a map. The selecting of characteristics for display can include selecting detail for display. For example, a level of detail can be selected. This level of detail may vary across the map.

An advantage of selectively displaying features on a map display is that the driver is not distracted by detail that is not relevant to guidance along the planned route. By adapting the selection of features according to factors that include the density of features in the vicinity of the vehicle's position, and the distance to and density of features or maneuver points, an appropriate level of detail is provided in various route guidance conditions.

An advantage of providing a not-to-scale representation of a map is that a high-resolution can be provided in the vicinity of the vehicle while providing a longer-range view of the route, which would not have been possible on a scale representation of the map.

An advantage of providing notifications of features, such as notifications of upcoming intersections is that the driver can more easily follow directions. In addition, in the context of guidance along a planned route, notifications provide a desirable level of confirmation to the driver that the planned route is being followed.

DESCRIPTION

1 System Architecture

Figure 1:
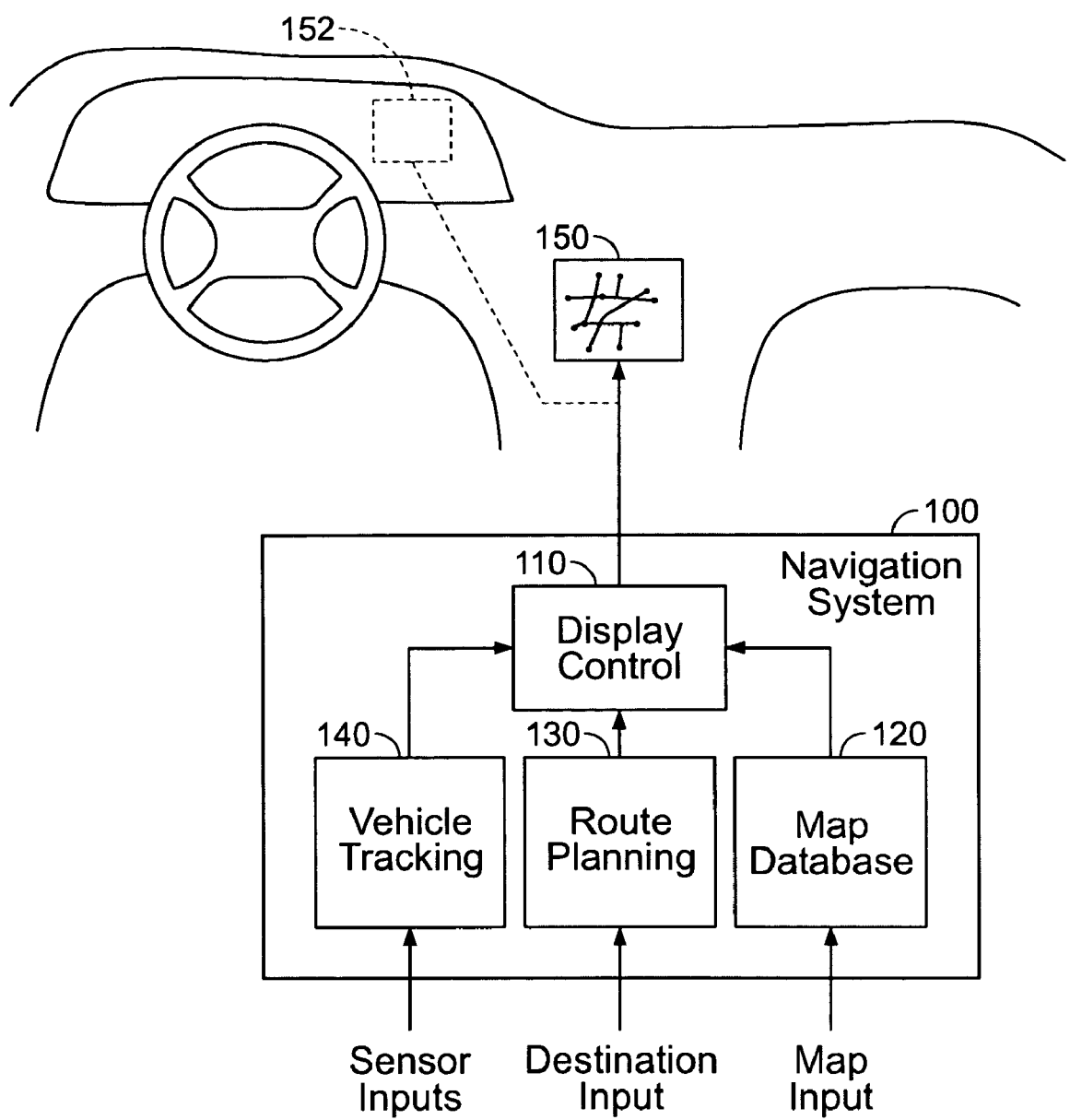
FIG. 1 is a diagram of a vehicle navigation system.

Referring to FIG. 1, a vehicle navigation system 100 provides map display, route planning, and route guidance services to a driver of a vehicle. A vehicle-tracking component 140 makes use of sensor inputs, such as satellite-based position measurements (e.g., using the Global Positioning System, GPS) and dead reckoning measurements (e.g., using odometer measurements), to determine a location and heading of the vehicle. The system includes a map database 120, which is input to the system from a DVD-ROM, or through some other data input. The map database includes map data that represents a road network as a set of road segments and points joining the road segments. The system also includes a route-planning component 130, which accepts a destination input and plans a path through the road network according to a criterion such as a shortest path or a shortest expected travel time. A planned route typically includes a series of maneuvers, such as turns at intersections.

Navigation system 100 includes a display control component 110, which uses the map database 120, a planned route from the route planning component 130, and the vehicle's position and heading from the vehicle tracking component 140 to display information on a display screen. The display screen can include a graphics display 150 mounted in the dashboard of the vehicle and optionally on a graphics or a text display 152 on the instrument panel of the vehicle. The display control component 110 selects display characteristics for presentation of map information to the driver. When the driver is not following a pre-planned route known to the navigation system, the map display provides the driver with a sense of where the vehicle is located on the road network. When guiding the driver along a planned route, the display control component 110 additionally presents map information to direct the driver along the route as part of the route guidance service provided by the system. In one implementation, the display control component 110, route planning component 130, and vehicle tracking component 140 each includes one or more software modules that execute on a computer processor embedded in the navigation system 100. The display control component 110 makes use of software services that provide interfaces to the display 150 and to the map database 120. The display control component also includes software for computing map scale and level of detail based on data it receives from the other components. The vehicle tracking component 140 makes use of software services that provide an interface to sensors, such as to GPS and dead reckoning sensors.

Figure 2:
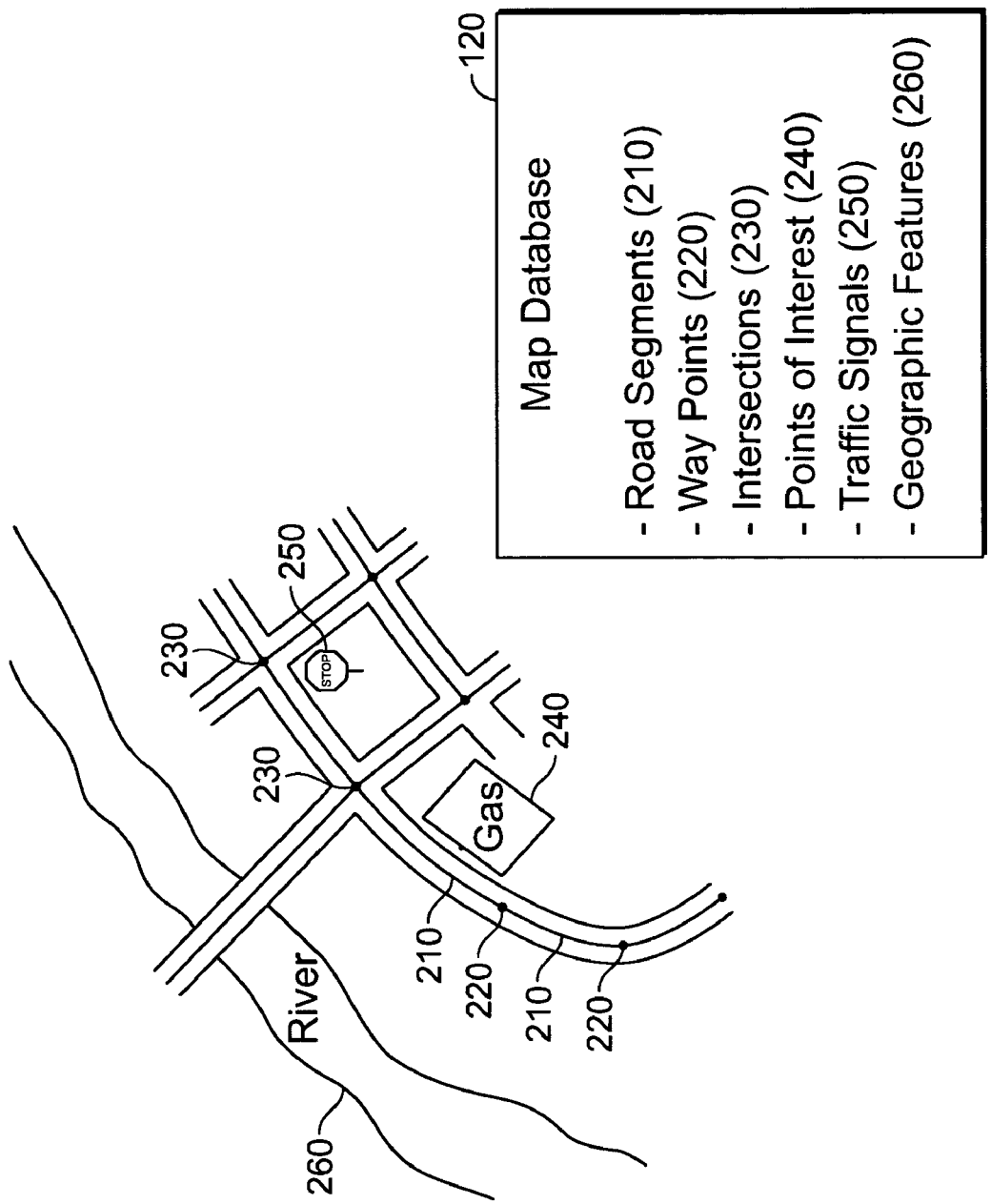
FIG. 2 is a diagram that illustrates map data.

Referring to FIG. 2, the map database 120 includes representations of roads using, for example, straight road segments 210 connected at points. Some of the points are waypoints 220, which are used to represent curved road sections using straight road segments joined at the waypoints. Other points correspond to intersections 230. The map database includes information related to each road segment, for example, including the name of the road, the size of the road (e.g., major highway, boulevard, local road, lane), speed limit, and street numbers. The map database also includes characteristics associated with intersections, such as traffic signals 250 (e.g., stop signs, traffic lights, etc.) that may be present. The data can also include locations and descriptions of points of interest (POIs) 240, such as gas stations and restaurants, including location information for each point of interest allowing the point of interest to be located on the road network. The data can also include representations of geographic features 260, such as rivers, hills, and political regions, such as cities, towns, and neighborhoods.

2 Display Control

The display control component 110 generates an image that represents map information for presentation on display 150 (see FIG. 1) and continually updates the image as the vehicle travels over the road network. In general, the display subsystem selects display characteristics, such as a level of detail for the information for presentation on the display and the arrangement (e.g., scale, orientation) of that information with a goal that only relatively important information is displayed to the driver. For example, the information that is displayed provides the driver with a sense of where the vehicle is located on the road network, without necessarily providing excess information that does not help in that task. For guiding the driver along a planned route, the information that is displayed is sufficient to provide a level of comfort to the driver regarding the following of the route, for example, comfort that they are on the planned route and comfort that they will be able to make the necessary upcoming maneuvers to stay on the route. The resulting level of detail that is displayed is not necessarily uniform over the entire screen, for example, presenting more detail near the current location of the vehicle or near the planned route as compared to other geographic areas. Furthermore, the display does not necessarily present a map having a uniform scale. For example, the map may be distorted (in scale and/or direction) such that the scale is different in different parts of the map, and the direction of travel is not necessarily consistent with a compass direction on the map. For example, directions may be distorted in a manner that is often found in subway maps, which may show the sequential relationship between subway stops but may not necessarily be faithful to the direction of travel or exact distance between stops. The level of detail and scale of the displayed mapped is continually automatically varied by the display control component without requiring input from the driver. This enables presentation of relatively more detail and/or larger scale when required to guide the driver at a maneuver point along a planned route while enabling presentation of less detail and smaller scale when useful to provide longer-range perspective of the planned route. For example, manual control of a degree of zoom is not required. Optionally, manual controls over the display may also be provided, for example to control zoom and detail levels of the display.

The display subsystem uses various criteria for determining how to generate an image for display. As described further below, some of the factors that determine how the image is generated can include the following:

Properties of the planned route, such as the locations of upcoming maneuver points, a complexity of the route (e.g., number of maneuvers per geographic unit of distance), and overall extent of the route.

Distance from the current vehicle location, from a planned route, or from the starting location or final location on a planned route.

Density of features, such as the number of roads of particular size in a unit geographic area or per unit distance along the planned route or road being traveled.

Driving characteristics, such as vehicle speed.

In one approach, a presentation scale for map information is computed such that in general the scale varies across the display screen. The non-uniform scale enables more relevant information to be displayed as compared to using a uniform scale over the whole display. In general, areas of the map with less relevant route information are presented at a smaller scale, while areas with more information are presented at a larger scaled permitting the display of more detail in those areas.

One particular approach to determining a non-uniform scale for the map involves first assigning a score (or other measure of importance) to each maneuver on a planned route. This score is based on a weighted sum of heuristics, which are based on the following attributes of each maneuver:

a. Distance from the maneuver the to next/previous maneuver (i.e., closely packed maneuvers should have a higher weight) and optionally to the current vehicle location b. Distance between cross streets or density of other map features in the vicinity of the maneuver.

c. Difference between road types pre and post maneuver (for example, exiting a highway is a important maneuver, whereas just following one city street into another is not as important)

d. Maneuver angle—90 degree turns have higher scores than 10 degree merges e. Complexity of intersection—if more than two roads intersect at the maneuver point the maneuver receives a higher score.

The maneuver scores along the planned route are used to identify maneuver clusters. Maneuver clusters are areas of the map that have a number of successive maneuvers. One approach to identifying the clusters makes use of a statistical technique that uses the locations and scores of the maneuvers to form the clusters. Each cluster as a whole is assigned a score based on the scores of the maneuvers in the cluster, for example, as a sum or an average of the individual maneuver scores. As described further below, important clusters (i.e., clusters with high scores) are rendered at a relatively higher scale to show more detail. For example, if a planned route involves travel along a highway until an exit at an interchange involving a number of closely spaced maneuvers, these related maneuvers might form a maneuver cluster that has a relatively high score. The display control component would then display these related maneuvers at a relatively larger scale. Note that alternatively, a uniform display scale can be determined according to the maneuver scores or other computed characteristics of upcoming maneuvers on a planned route. For example, if the next maneuver is complex (high score) then the map scale for the entire display may be increased and the level of detail increased to support the driver in navigating the maneuver. Conversely, if the next maneuver is relatively simple (low score) then the map scale may be relatively small, giving a longer-distance perspective on the travel route.

Once the clusters and the associated cluster scores are computed by the display control component, it determines the highest scoring clusters, which will be displayed at larger scale. For example, a threshold maximum number of clusters (e.g., N=3 clusters) are displayed at the larger scale. The display control component then determines a scale at which these clusters can be displayed on the screen. Having chosen the scale for the selected important clusters, the display control component selects a smaller scale or scales for the intermediate maneuver clusters, and thereby determines the spatially varying scale for the entire display.

Other factors can alternatively be used in determining the importance of maneuvers and can include the distance from the current location, such that maneuvers farther down the route are scored lower than closed maneuvers. In addition, vehicle speed, traffic condition, and other factors that may make execution of the maneuvers along a planned route more difficult for the driver can be used as a basis for assigning higher scores to maneuvers.

The display subsystem determines the map scale and a level of detail in a combined manner. For example, the scale of the map in the vicinity of the vehicle's current location is determined such that the next maneuver (or fixed number of upcoming maneuvers) is within a certain display distance (i.e., close enough to display on the screen along with the correct vehicle location, but far enough away to allow presentation of relevant features such as upcoming cross streets prior to the maneuver). One approach to this calculation is to calculate a maximum map scale based on the distance from the current vehicle location to the next maneuver point such that the display can fit both the current location and the maneuver point. If this maximum scale exceeds a pre-set threshold, the scale is reduced to the threshold. The selection of features to display along the route at a particular scale may relate to the resulting density of features on the display. For example, only a maximum number of features per unit of display distance may be displayed. The features for display can be selected according to a level of detail. For example, the size or importance of road segments, points of interest, etc. in the map database can be represented as a numerical or ordered categorical quantity, and the level of detail can correspond to a threshold on that quantity which determine whether to select the feature. The detail for display of a feature can include a graphical representation of the feature, and a text label for the feature, or both. The selection of level of detail may be performed separately for the graphical representations and for the text label, such that some features are not shown at all, some features are shown but not labeled, and others are both shown graphically and are labeled.

On the other hand, the scale of the displayed map in the vicinity of the vehicle may be determined based on the number of features before the next maneuver, for example, allowing all the cross streets before a turn to be displayed without resulting in a close spacing of the streets on the display. For example, along a route that includes both a city portion and an interstate highway portion, the scale on the interstate portion may be such that longer geographic distances are shorter on the display as compared to the city portions. The display control component 110 employs a variety of heuristics to determine the scale and level of detail along the upcoming route. For example, the scale is chosen according constraints such as a minimum spacing of features on the display, larger scale with a higher feature density, smaller scale at higher driving speeds, more features near a maneuver point, etc.

As a specific example of an approach to selecting the features to display at a particular scale, the display control component first determines which upcoming road segments of a pre-planned route are visible on the screen using the current map scale. For each of these road segments, any intersecting road segments are noted. For each intersecting road segment, the display control component assigns a weighted score based on the following characteristics a. Size of road (local road, major road, route, highway, superhighway, etc.)

b. Distance from road segment to a route maneuver (the closer you are to a turn, the more important it is to know what roads to expect to see before and after the turn)

c. Type of intersection (traffic light, stop sign, fork, etc.)

d. Type of the closest maneuver (i.e. make sure to display the road before a hard left turn, last exit before leaving the highway, etc.)

The list of intersecting road segments for the route is then sorted using these weighted scores, and only the top N intersecting roads based on the weighted score are displayed. This results in a map display that is less cluttered and only or primarily displays information that is useful to the driver following a particular route. If a different route is calculated, the displayed intersecting roads will change accordingly. N is chosen to be inversely related to the map scale such that more features can be displayed at lower map scales (zoomed out) than at higher map scales (zoomed in). Note that the amount of detail may not increase to the degree the scale is reduced to maintain a desirable level of detail allowing the driver to concentrate on relevant information on the map. This approach can be applied to other features, such as points of interest and traffic signals to determine which of those features are to be displayed.

The proximity to a maneuver location may also determine the level of detail to be displayed. For example, cross streets that come just before or just after a turn may be displayed while equally large cross-streets that are farther from a maneuver location may be omitted from the display. Similarly, on a highway, the exits immediately prior to and following an exit on the planned route may be displayed, while other exits are omitted.

The display control component 110 also determines the scale and level of detail for areas of the map away from the planned route. For example, the level of detail is reduced as the distance from the planned route increases, and relatively minor roads compared to the roads on the planned route may be displayed only for a limited range (e.g., three blocks) from the planned route.

For streets, the selection of the level of detail includes both a decision of whether to display a road segment, as well as a decision of whether to label the road segment with the road name. For example, only cross streets to a planned route, or only streets within a particular range of the current vehicle location may be labeled while other roads are not labeled.

As an alternative to or in addition to presenting less detail farther from the planned route, the more distant regions of the map may be graphically de-emphasized, for example, by fading (e.g., lower intensity) the display in those areas or providing less vivid colors (e.g., gray or lower color saturation).

Versions of the approaches described above are applicable in situations in which the driver is not following a planned route that is known to the navigation system. For example, the driver may be following a route that he is familiar with or following a route for which he has received written or oral directions, but that have not been entered into the navigation system. In one example of such an approach, map scale and detail level are adjusted according to proximity to the vehicle of potentially important map features and alignment of the map to the vehicle's direction of travel. For example, details further along the road being followed, or within a tolerance of the general direction of travel of the vehicle can be emphasized. The system uses the current roadway and direction of travel instead of a planned route, and determines the map scale and detail level using the current road type, road network density, and vehicle speed and direction, using heuristics such as those described above in the context of maneuvers for a planned route. For example, the system would decrease scale and detail level when the vehicle is traveling on a restricted-access highway, while increasing scale and detail level when the vehicle is traversing city streets. Similarly, the map scale and level of detail may increase as a vehicle approaches a highway interchange, or when the vehicle slows down relative to the speed limit, possibly indicative of the driver intending to make a turn or searching for a landmark needed to follow directions that have been provided to the driver. In this non-guided scenario, the system provides similar benefits to the driver in terms of reducing map display complexity and providing roadway and travel condition appropriate scale. As with the guided scenario, different versions of the display approach use uniform as well as non-uniform map scales and levels of detail.

In versions of the system that allow manual control over scale (zoom), manually changing the scale of the map does not necessarily increase the level of detail of the map. Similarly, the user is optionally provided with an input that controls the level of detail, without directly changing the scale.

3 Use Scenario

Figure 3A:
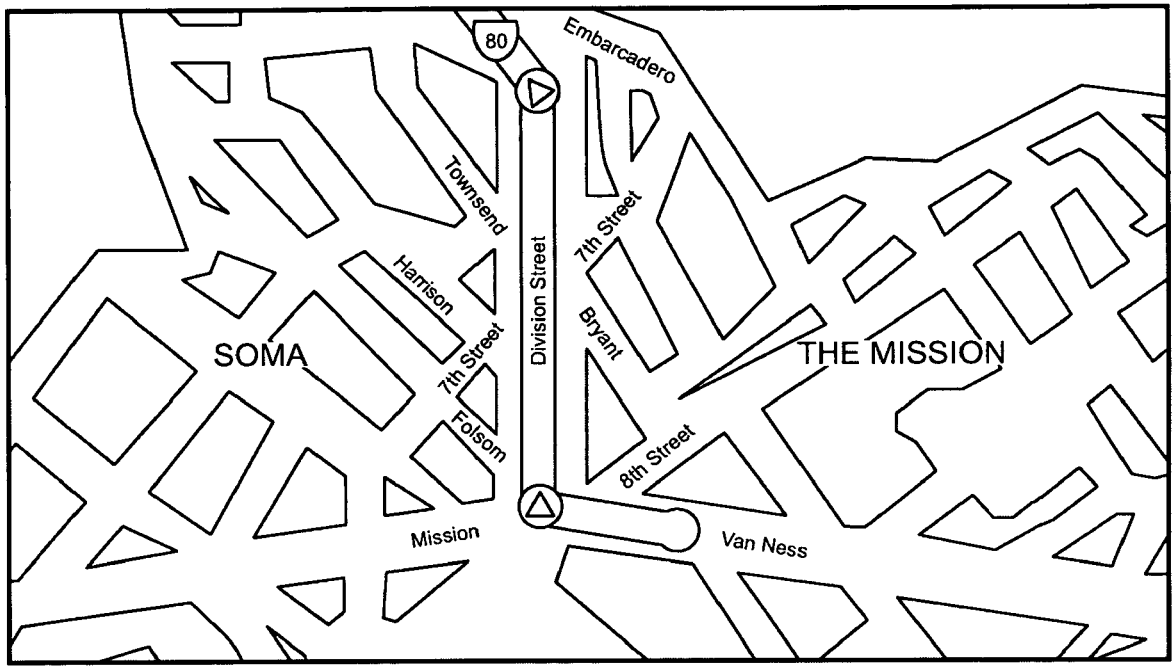
FIGS. 3A-E are images for display by the navigation system.

Referring to FIGS. 3A-E, a series of snapshots of the continuously varying image generated by the display control component 110 during a vehicle's travel along a planned route exhibit various scales and level of detail of features in the image. Referring to FIG. 3A, a first image shows a street-level detail view of the vehicle's surroundings. The image provides a view of the next maneuvers, a right turn on Division Street followed by a left onto Route 80. Only the streets in and intersecting the route are labeled, as are the neighborhoods/zones (e.g., "Soma" and "The Mission") in the proximity of the planned route.

Figure 3B:
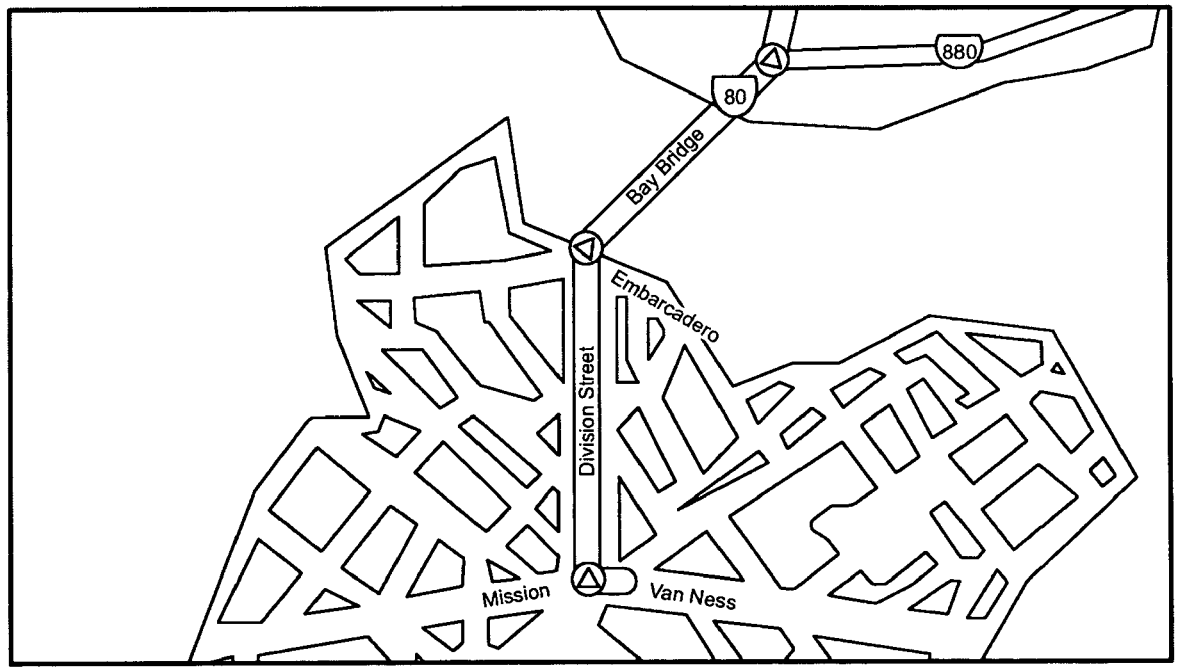
Figure 3C:
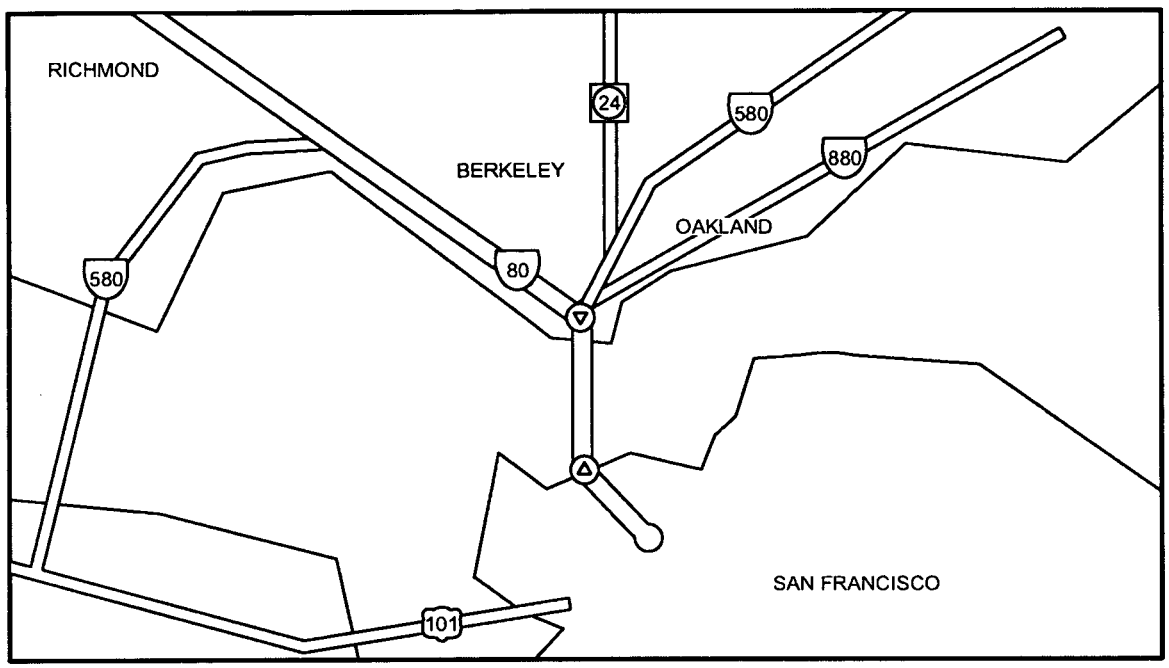
Figure 3D:
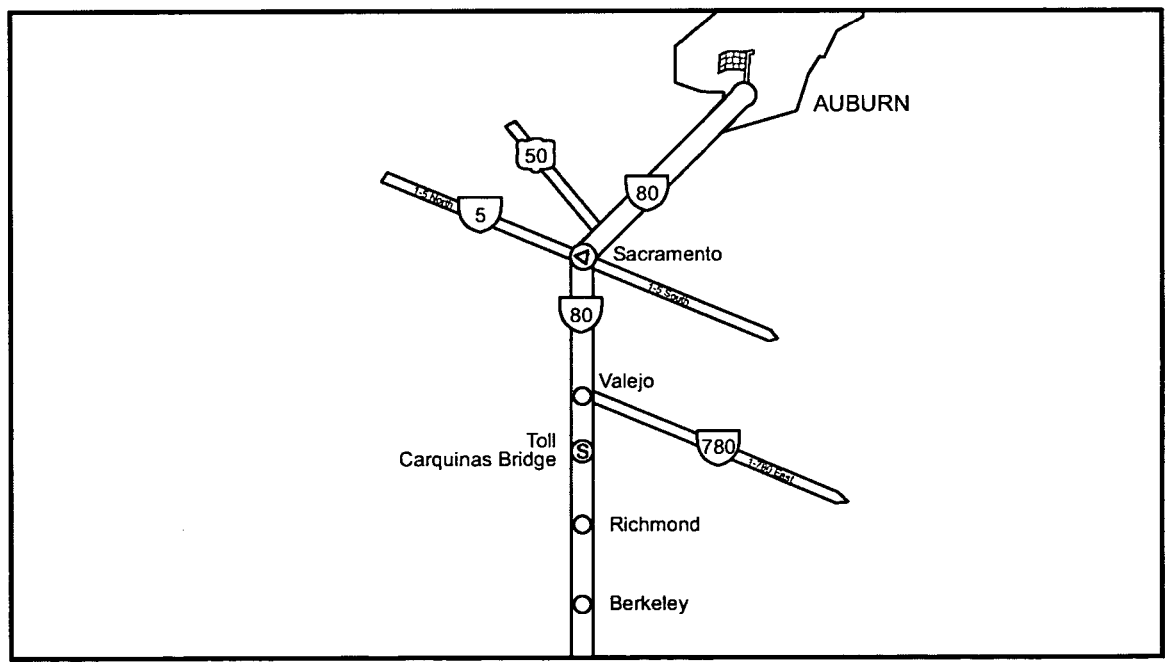
Figure 3E:
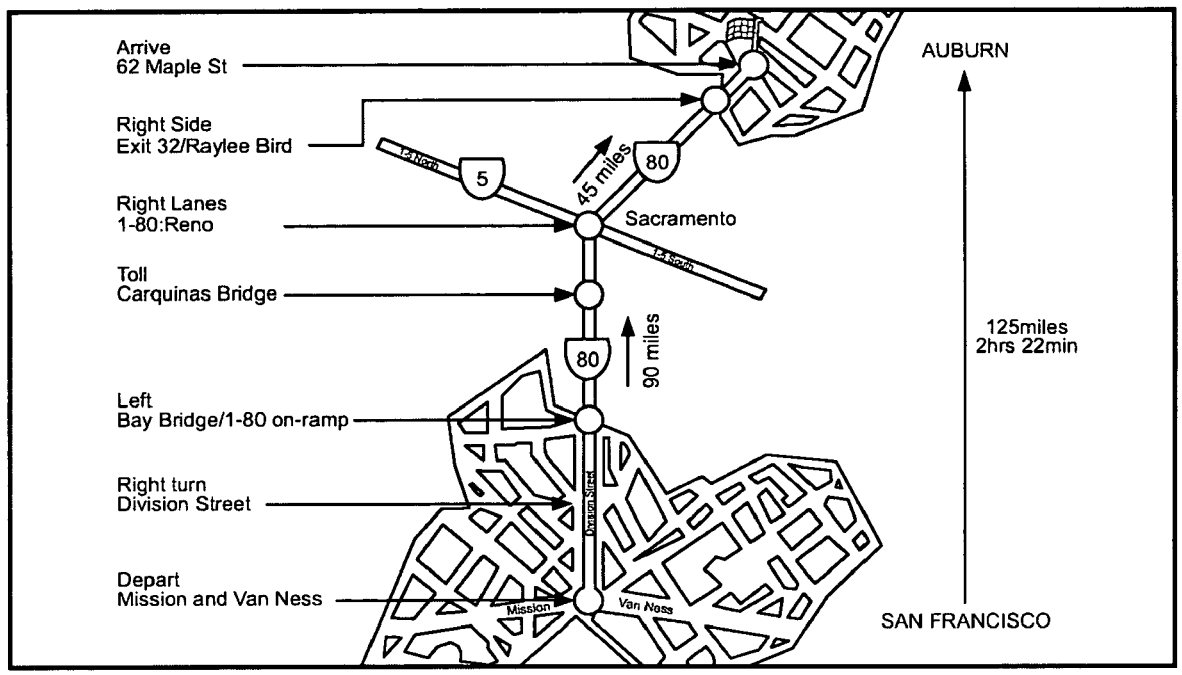

Referring to FIG. 3B, after the vehicle completes the right turn onto Division Street, the scale of the map changes (i.e., changes to a smaller scale) to include the following two maneuver points. The orientation of the map also changes to generally maintain a direction of travel towards the top of the display. The street level details are dropped from the map and the scale of the map changes. Only the more prominent geographic and road features are shown in the image. Referring to FIG. 3C, after the next maneuver, only features relevant to the approximate geography, restricted access highway, and major driving maneuvers are shown. Referring to FIG. 3D, as the vehicle proceeds on the highway, the map display shows only the most relevant features: major cities, major interstate and state highways, and driving maneuvers. Referring to FIG. 3E, in an alternative view, the display shows a street-level of detail near the end-points of the planned route and compresses the scale of the largely uneventful distance along the highway between the endpoints. Only the major driving maneuvers and intersections are shown on the display.

Figure 4A:
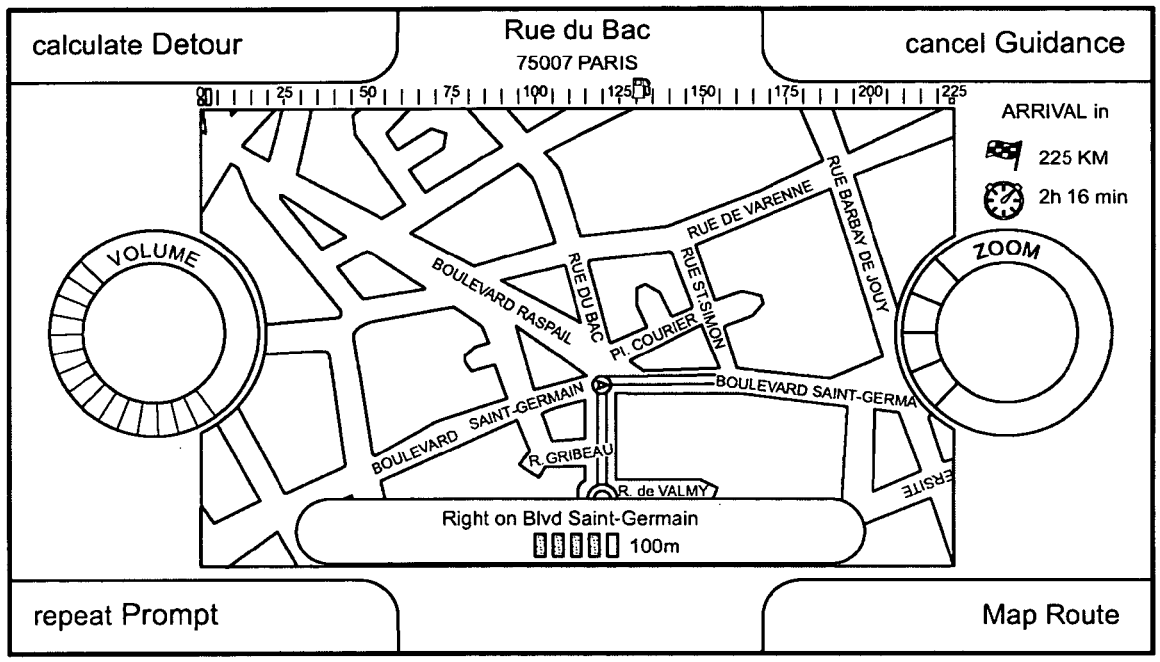
FIGS. 4A-F are images for display by the navigation system.
Figure 4B:
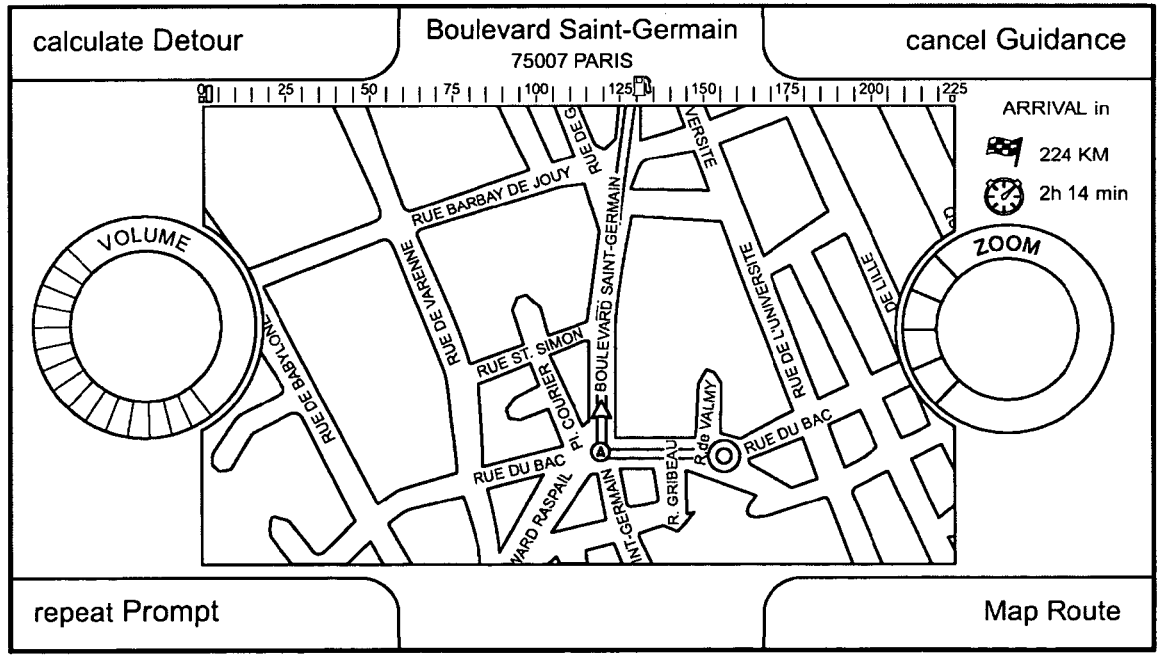
Figure 4C:
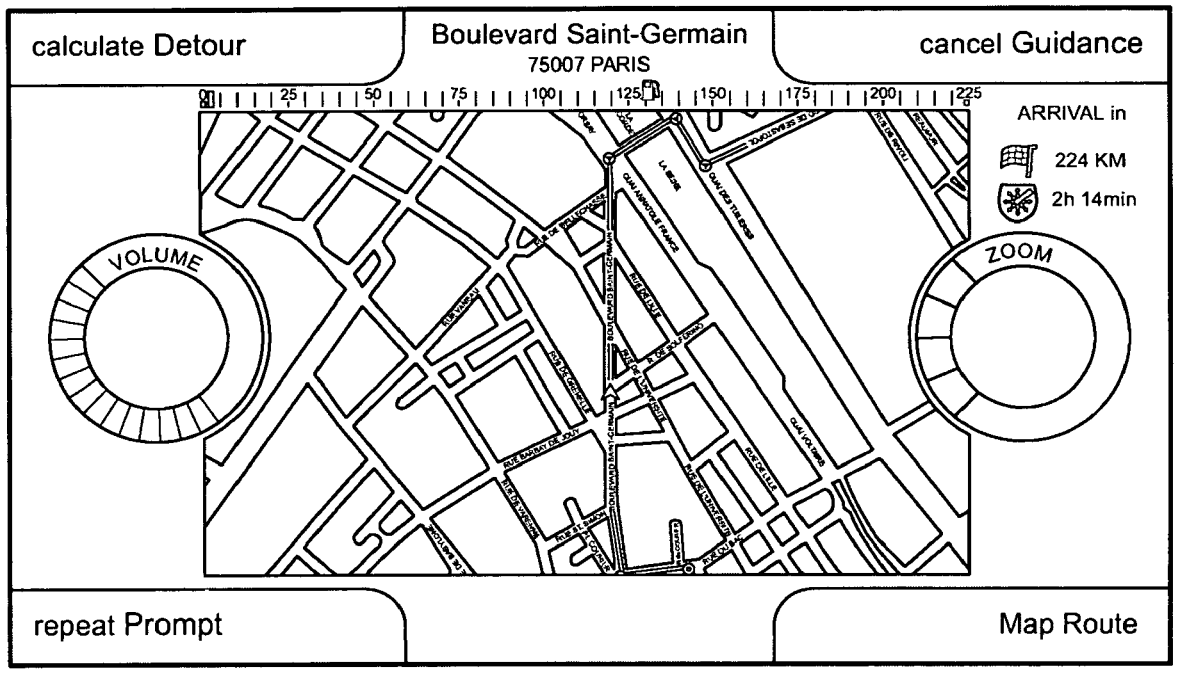
Figure 4D:
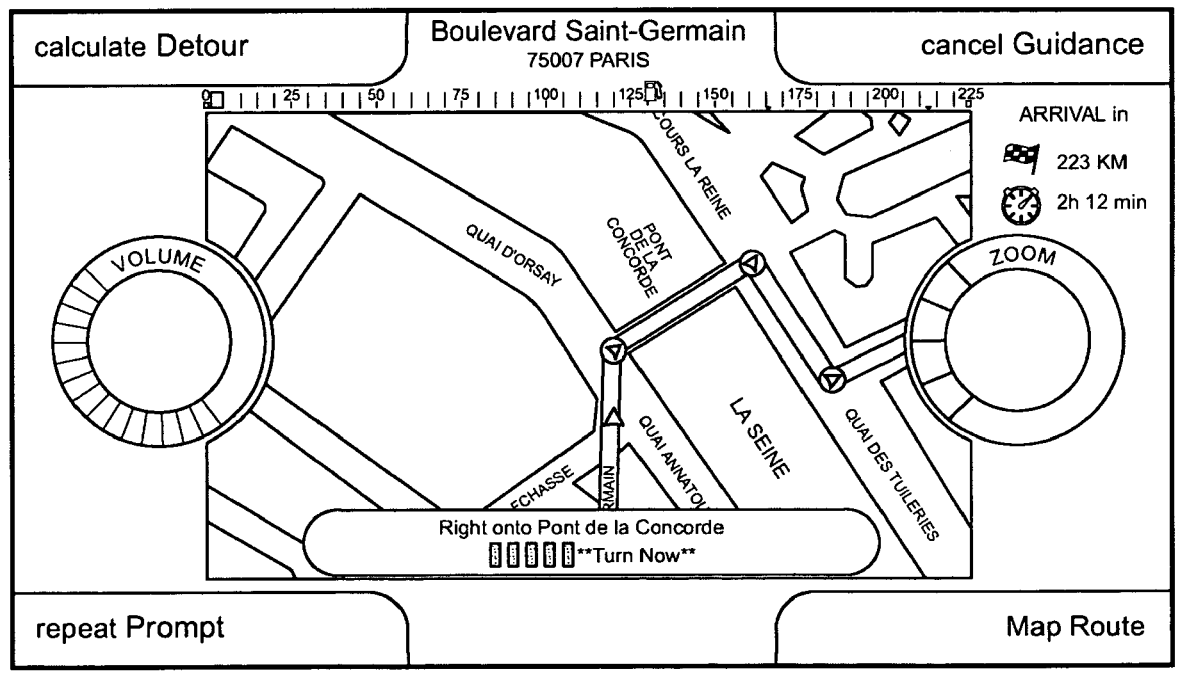
Figure 4E:
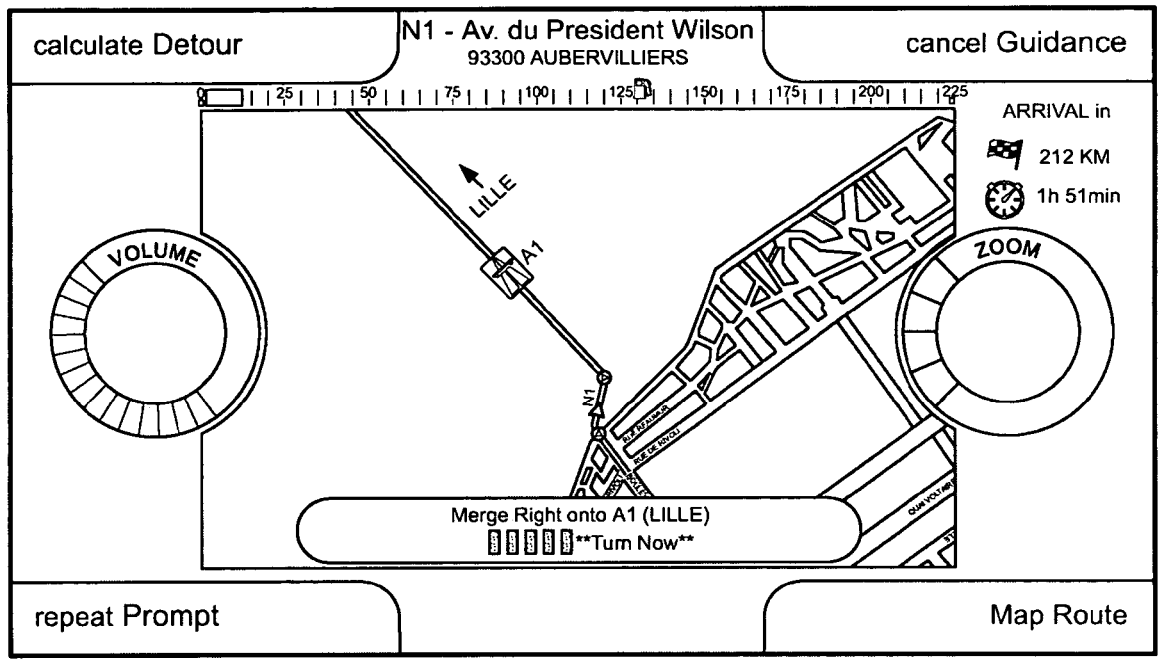
Figure 4F:
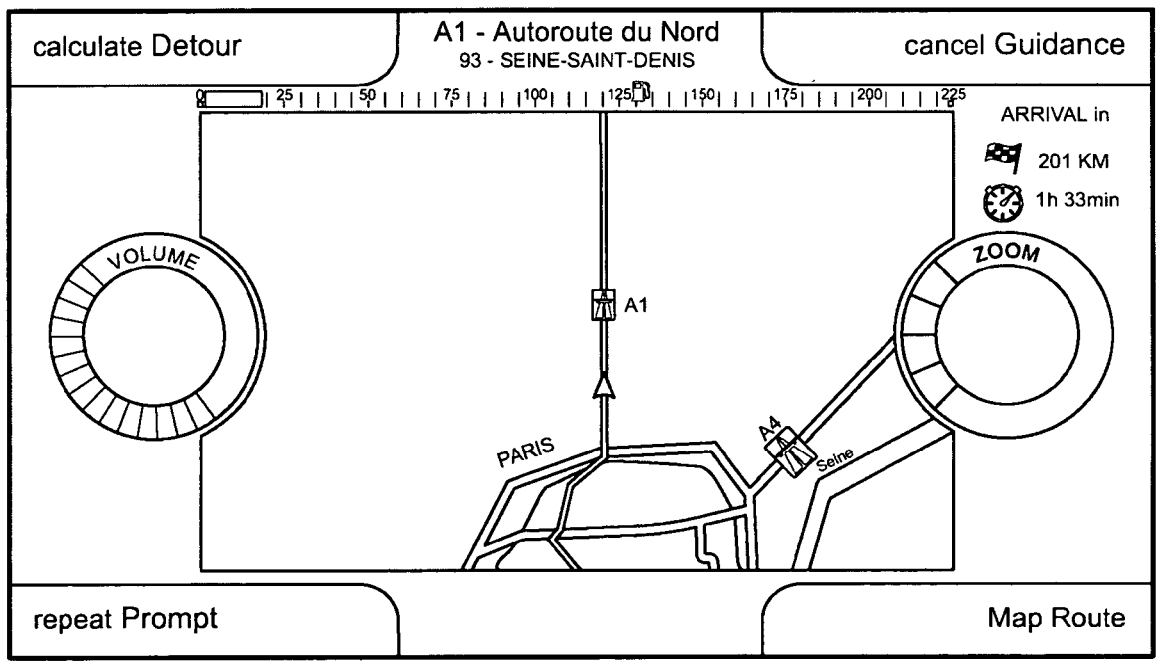

Referring to FIGS. 4A-F, a second scenario also exhibits different scale and levels of detail at different points along a planned route. In FIG. 4A, a first maneuver ("right on Blvd Saint-Germain") is indicated along with a bar graph indicating the distance remaining along the planned route before the maneuver. Relatively minor streets are indicated, with streets intersecting with or near the planned route being labeled with the names of the streets. In FIG. 4B, after the right turn, the orientation of the map is adjusted to generally maintain a direction of travel toward the top of the display. In FIG. 4C, as the vehicle move away to from the maneuver along Blvd Saint-Germain, the scale of the map is reduced to show both the last maneuver as well as the next maneuver, a right onto Pont de la Concorde. In FIG. 4D, as the vehicle approaches the right turn, the scale of the map again increases and the countdown bar graph is shown indicating the distance to the turn. In FIG. 4E, as the vehicle approaches a right turn onto highway A1, the scale of the map remains relatively small, in part due to the relative low density of features in the vicinity of the maneuver. In FIG. 4F, as the vehicle leaves the city of Paris along the A1 highway, the scale is reduced further, and the level of detail is reduced, for example showing only the boundary of the city and a limited number of major highways through the city.

4 Dynamic Notifications

The navigation system 100 supports an optional dynamic notification mode in which the driver is notified of upcoming intersections and other road or geographic or political features as the vehicle traverses the road network. This mode can be used both as the driver navigates a planned route as well as when the driver is not following a planned route. For example, the driver may be following instructions that were provided to him prior to a trip, for example, in written or oral form. The notification of the upcoming intersections aids the driver in following such directions.

In this dynamic notification mode, the vehicle-tracking component 140 maintains a continuous estimate of the vehicle's location on the road network. As the vehicle approaches intersections, the display control component 110 provides a display of a number of upcoming intersections, for example, presented as a list of names ordered by the proximity of each corresponding location to the vehicle. For example, the display control component shows the name of the next street in a framed overlay on the map in which the name of the next intersecting street is written in large letters. The display can optionally use audio prompting of the upcoming street name. The display control component can alternatively make use of the display 152 in the instrument panel to show the upcoming street names while concurrently maintaining a map image on display 150, or use audible prompts to notify to driver of each upcoming feature. The display can optionally include an indication of the distance to the next intersecting street, for example as a bar graph that shrinks as the street is approached, or a numerical quantity (e.g., in yards).

Figure 5A:
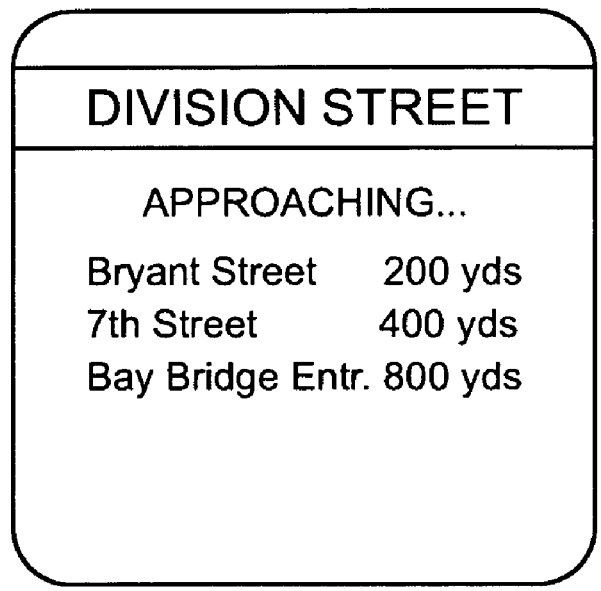
FIGS. 5A-B are images of a notification display.
Figure 5B:
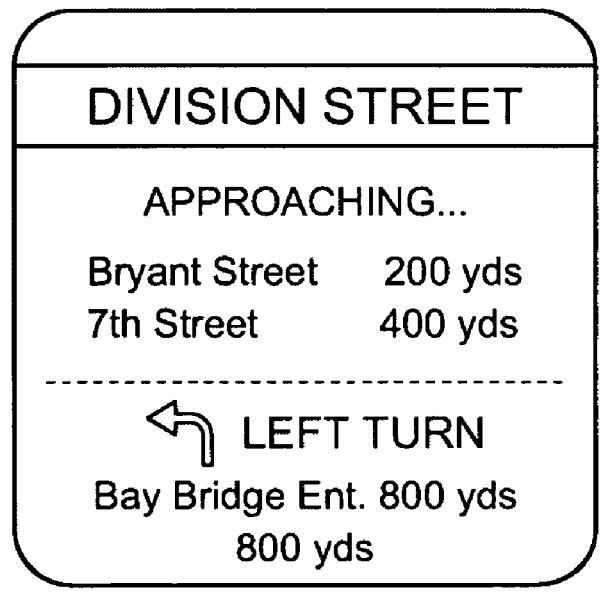

Referring to FIG. 5A, an example of an image that is shown on display 150 or display 152 indicates the current street being driven on ("Division Street") as well as the approaching intersections ("Bryant Street", etc.) along with the distance in yards to each approaching intersection. Referring to FIG. 5B, the dynamic notification approach can be combined with a route guidance mode. The display shows the upcoming intersections, in this case those intersections prior to a maneuver, as well as in indication of the next maneuver.

The notification approach is not limited to notification of intersecting streets. For example, based on the current road being traversed by the vehicle or based on an expected route of the vehicle, the driver can be notified of upcoming points of interest, traffic signal, or geographic feature, such as "gas station on right—200 yards," "stop sign—50 yards," "river—100 yards," or "steep uphill for next 200 yards". Similarly, the driver can be notified of road features such as "merging with route 80—150 yards" or "sharp right curve".

5 Alternatives

The description described above focuses on displaying map information in a vehicle navigation system. The techniques are applicable in other domains where map display and route guidance is needed. For example, the techniques can be applied to devices used for pedestrians. The techniques can also be used for devices, such a mobile phones, which may provide route guidance functions.

The description of a vehicle navigation system focuses on an autonomous system in which map display, route planning, and route guidance functions are hosted in the vehicle. The techniques described above are applicable to navigation systems in which some or all of the functions are hosted in devices outside the vehicle, for example, in a centralized server computer.

6 Implementation

A version of the system described above is implemented using a general-purpose processor, with software implementing the approaches and specific algorithms described above being stored in the system, for example, in a non-volatile solid-state memory (e.g., flash memory). For example, the display control module is implemented in software that is stored in the navigation system and that executes on a general-purpose processor or other form of configurable controller. The software may be provided on a medium, such as solid state memory or media, or magnetic or optical media, or downloaded over a wired or wireless communication network (i.e., with the instructions carried on signal propagating over a communication medium). Other versions of the system may be implemented in hardware or software, or a combination of both (e.g., programmable logic arrays, special purpose processors/controllers, etc.). Unless otherwise specified, the algorithms included as part of the invention are not inherently related to any particular computer or other apparatus. Each such program may be implemented in any desired computer language (including machine, assembly, or high level procedural, logical, or object oriented programming languages) to communicate with a computer system. In any case, the language may be a compiled or interpreted language.

It is to be understood that the foregoing description is intended to illustrate to limit the scope of the invention, which is defined by the scope of the appended Other embodiments are within the scope of the following claims.

What is claimed is:

1. A method for display of information for a mobile navigation system comprising:
   selecting characteristics for display according to characteristics of features in a map database, the selecting including:
      identifying clusters of maneuvers of a planned route,
      assigning a score to each cluster of maneuvers based on the characteristics of features present at the locations of the maneuvers,
      determining a relatively higher scale for times when a cluster having a relatively higher score is to be displayed, and determining a relatively lower scale for times when a cluster having a relatively lower score is to be displayed; and
   generating an image for display of a map according to the selected characteristics.

2. The method of claim 1 also comprising:
   selecting map features for presentation on the display;
   in which the characteristics for display include a scale for display that varies across the display; and
   the image for display is generated from the selected features.

3. The method of claim 2 wherein selecting at least some of the features is performed according to a level of detail of each feature.

4. The method of claim 1 wherein the map features include at least one of a road segment, a point of interest, a traffic signal, a geographic feature, and a political region.

5. The method of claim 1 wherein the characteristics for display include a level of detail.

6. The method of claim 1 wherein the level of detail varies across the display.

7. The method of claim 1 wherein the characteristics for display include a degree of highlighting that varies across the display.

8. The method of claim 1 wherein the degree of highlighting includes a degree of image intensity.

9. The method of claim 1 wherein the degree of highlighting includes a degree of image color saturation.

10. The method of claim 1 wherein the selecting of the characteristics for display is repeated at different locations of the mobile navigation system.

11. The method of claim 1 wherein the mobile navigation system is associated with a vehicle, and the selecting of the characteristics for display is repeated as the vehicle travels over a road network.

12. The method of claim 1 wherein the method provides an increasing level of detail as the vehicle approaches a predetermined location in the road network.

13. The method of claim 1 wherein the predetermined location in the road network includes a location of a planned maneuver for the vehicle.

14. The method of claim 1 wherein the selecting of the characteristics for display includes using factors that include at least one of a position of a vehicle, a path of a route for the vehicle, a location of a maneuver on the route, and a distribution of features.

15. The method of claim 1 wherein the selecting of the characteristics for display includes selecting at least one of a greater level of detail and a larger scale for a region near the vehicle as compared to a region relatively farther away from the vehicle.

16. The method of claim 1 wherein the selecting of the characteristics for display includes selecting at least one of a greater level of detail and a larger scale for a region near the path of the route as compared to a region relatively farther away from the path.

17. The method of claim 1 wherein the selecting of the characteristics for display includes selecting at least one of a greater level of detail and a larger scale for a region near a maneuver on the route as compared to a region relatively farther away from the maneuver.

18. The method of claim 2 wherein the selecting of the characteristics for display includes selecting at least one of a greater level of detail and a larger scale for a region with a relatively greater number of features as compared to a region with a relatively fewer number of features.

19. The method of claim 2 in which the selecting further includes identifying a number N of clusters having the highest scores; and determining the relatively higher scale for the N identified cluster.

20. The method of claim 19 in which the selecting further includes determining the relatively lower scale for at least one cluster having a lower score than any of the N identified clusters.

21. The method of claim 1 wherein the characteristics for display are further selected according to a distribution of features of planned route.

22. The method of claim 1 wherein selecting the characteristics for display is performed according to a spatial density of the features.

23. The method of claim 22 wherein selecting the characteristics for display includes selecting a relatively larger scale for a higher density of features than for a lower density of features.

24. The method of claim 22 wherein selecting the characteristics for display is performed according to a density of the map features along a route.

25. The method of claim 1 wherein selecting the characteristics for display includes selecting a scale for display.

26. The method of claim 25 wherein selecting the scale for display includes selecting a scale for display that varies across the image.

27. The method of claim 1 wherein selecting the characteristics for display includes selecting detail for display.

28. The method of claim 27 wherein selecting the detail for display includes selecting a level of detail for display that varies across the image.

29. The method of claim 1 in which assigning a score to each cluster includes:

assigning a score for each maneuver,
computing the score for each cluster based on the scores of the maneuvers included in the cluster.

30. The method of claim 29 in which computing the score of each cluster includes:

summing the scores of the maneuvers included in the cluster.

31. The method of claim 29 in which computing the score for each cluster includes:

averaging the scores of the maneuvers included in the cluster.

32. Software stored on a computer-readable medium comprising instructions for causing a data processing system to:

select map features for presentation on a display according to characteristics of features in a map database;
identify clusters of maneuvers of a planned route,
assign a score to each cluster of maneuvers based on the characteristics of features present at the location of the maneuvers
determine a relatively higher scale for times when a cluster having a relatively higher score is to be displayed,
determine a relatively lower scale for times when the cluster having a relatively lower shore is to be displayed
select characteristics for display, the characteristics for display including a scale for display that varies across the display; and
generate an image for display from the selected features according to the selected characteristics.

33. A mobile navigation system comprising:

a display;
a storage for holding a map database; and
a controller coupled to the display and to the storage and configured to
select characteristics for display according to a distribution of features in the map database, the selecting including identifying clusters of maneuvers of a planned route,
assigning a score to each cluster of maneuvers,
determining a relatively higher scale for times when a cluster having a relatively lower score is to be displayed, and
determining a relatively lower scale for times when a cluster having a relatively lower score is to be displayed; and
generate an image for presentation of a map on the display according to the selected characteristics.

34. The mobile navigation system of claim 33 in which the controller is also configured to select map features from the map data for presentation on a display, select characteristics including a scale for display that varies across the display, and generate the image from the selected features.

35. The system of claim 34 wherein selecting at least some of the features is performed according to a level of detail of each feature.

36. The system of claim 34 wherein the map features include at least one of a road segment, a point of interest, a traffic signal, a geographic feature, and a political region.

37. The mobile navigation system of claim 33 in which:

the controller is also configured to determine a location of the vehicle and a travel route on a road network, select the map features from the map data by selecting features that are upcoming on the travel route according to the identified location of the vehicle, and include in the generated image a list of identifications of the selected map features.

38. Software stored on a computer-readable medium comprising instructions for causing a data processing system to:

select characteristics for display according to a distribution of features in a map database;

identify clusters of maneuvers of a planned route, assign a score to each cluster of maneuvers, determine a relatively higher scale for times when a cluster having a relatively higher score is to be displayed, determine a relatively lower scale for times when a cluster having a relatively lower score is to be displayed and generate an image for display of a map according to the selected characteristics.

39. The software of claim 38, in which the instructions also cause the data processing system to:

determine a location of a vehicle and a travel route on a road network;

select the map features from map data by selecting features that are upcoming on the travel route according to the identified location of the vehicle, and include in a generated image a list of identifications of the selected map features.

40. The software of claim 39 wherein the selected map features include at least one of a cross street to the travel route, a point of interest on the travel route, a traffic signal on the travel route, and a geographic feature in the proximity of the travel route.

* * * * *